Nov. 11, 1924.  
J. T. GLASS  
1,514,691  
PULLING DEVICE FOR VEHICLES  
Filed April 15, 1924

Inventor  
John T. Glass

By  
Hardwy Carter  
Attorneys

Patented Nov. 11, 1924.

1,514,691

UNITED STATES PATENT OFFICE.

JOHN T. GLASS, OF HARRISBURG, TEXAS.

PULLING DEVICE FOR VEHICLES.

Application filed April 15, 1924. Serial No. 706,709.

*To all whom it may concern:*

Be it known that I, JOHN T. GLASS, a citizen of the United States, residing at Harrisburg, in the county of Harris and State of Texas, have invented certain new and useful Improvements in a Pulling Device for Vehicles, of which the following is a specification.

This invention relates to new and useful improvements in a pulling device for vehicles.

One object of the invention is to provide a device of the character described, especially designed for use on motor vehicles for pulling the same out of bogs, or mud holes, or over roads which cannot be traversed by the ordinary traction of the driving, or traction, wheels of the vehicle.

With the above and other objects in view, this invention has particular relation to certain novel features of construction, operation and arrangement of parts, an example of which is given in this specification, and illustrated in the accompanying drawings, wherein:—

Figure 1:
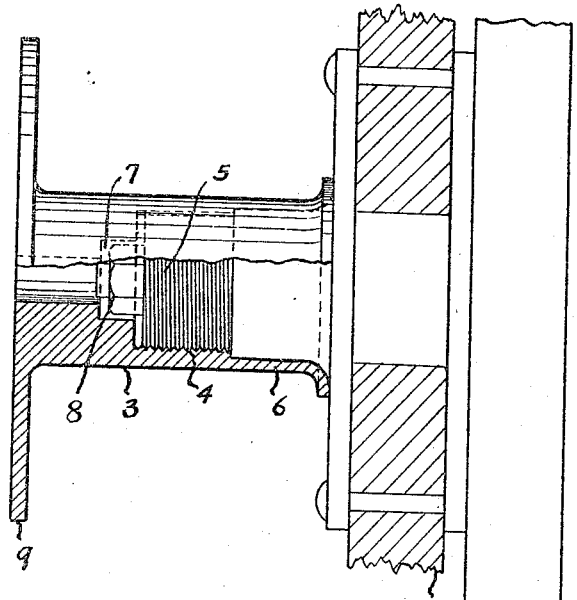
Figure 2:
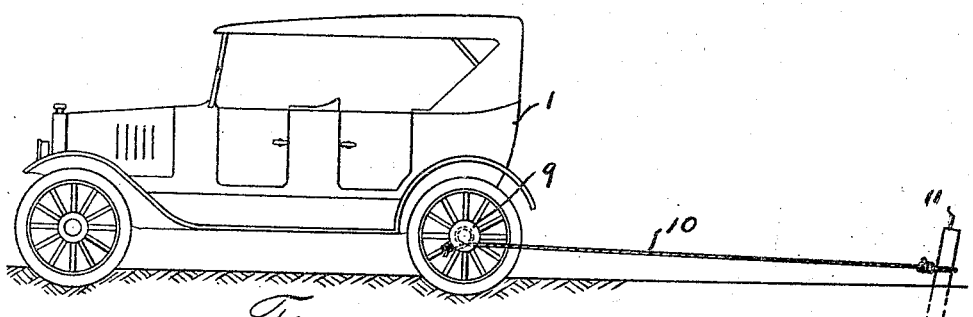

Figure 1 shows an enlarged fragmentary sectional view of the vehicle wheel, with the drum attached thereto, and shown partly in section; and, Figure 2 shows a side view of a vehicle illustrating the application of the device.

In the drawings, the numeral 1 designates the vehicle as a whole. To the hub 2, of either traction wheel, a flanged drum 3 may be attached. In order to attach this drum the wheel hub cap is first removed. The inner end of the drum has a deep internally threaded socket 4, to receive the outwardly threaded portion 5 of the hub and has the extended blank sleeve 6 to fit closely over the blank portion of the hub, and is flared and abuts against the adjacent hub plate to give a strong anchorage. The inner end of the socket 4 has a recess 7 to receive the nut 8, by means of which the wheel is secured to the axle.

The outer end of the hub has an annular flange 9 to retain the pulling cable 10 on the drum. One end of this cable is tied to the wheel spoke, and it is wound around the drum and its other end is tied to a stake, or other anchor 11 located either in front of or behind the vehicle. When the traction wheel is clutched with the motor, and driven, the winding of the cable on the drum will operate to pull the vehicle out by its own power.

What I claim is:—

1. In combination with a vehicle wheel, a drum having a deep socket in one end formed with internal threads, and a blank sleeve beyond the threads, adapted to receive and fit closely around the wheel hub, the bottom of said socket having a nut receiving recess, and an annular flange carried by the other end of the drum.

2. In combination with a motor vehicle, a drum whose outer end is formed with an annular flange, and whose inner end is formed with a deep socket, said socket having an internally threaded portion to receive the threads of the vehicle wheel hub, the outer end of the socket being blank to receive the blank portion of the hub.

3. In combination with a motor vehicle, a drum whose outer end is formed with an annular flange, and whose inner end is formed with a deep socket, said socket having an internally threaded portion to receive the threads of the vehicle wheel hub, the outer end of the socket being blank to receive the blank portion of the hub, the inner end of the socket having a recess to receive the nut securing the wheel on the vehicle axle.

4. In combination with a vehicle wheel, a drum having a deep socket at one end, formed with internal threads and a blank flared sleeve beyond the threads adapted to fit snugly on the wheel hub, and an annular flange carried by the other end of said drum.

5. In combination with a vehicle wheel, a drum, an annular flange carried by one end of the drum, the other end of the drum having a deep socket formed with internal threads, said end of said drum being formed with a blank flared sleeve beyond the threads adapted to receive and fit closely around the wheel hub, the bottom of said socket having a nut receiving recess.

In testimony whereof I have signed my name to this specification in the presence of two subscribing witnesses.

JOHN T. GLASS.

Witnesses:
WM. A. CATHEY,
JOHN WM. PALMER.